(12) United States Patent
Baek

(10) Patent No.: US 10,229,591 B2
(45) Date of Patent: Mar. 12, 2019

(54) TRAFFIC SIGN BOARD EASILY IDENTIFIABLE DURING DAY AND NIGHT

(71) Applicant: KIDONG CO., LTD, Namyangju-si, Gyeonggi-do (KR)

(72) Inventor: Woon-Hoi Baek, Namyangju-si (KR)

(73) Assignee: Kidong Co., Ltd., Namyangju-si (KR)

( * ) Notice: Subject to any disclaimer, the term of this patent is extended or adjusted under 35 U.S.C. 154(b) by 0 days.

(21) Appl. No.: 16/037,474

(22) Filed: Jul. 17, 2018

(65) Prior Publication Data

US 2019/0043352 A1 Feb. 7, 2019

(30) Foreign Application Priority Data

Aug. 2, 2017 (KR) .................. 10-2017-0098298

(51) Int. Cl.
| | | |
|---|---|---|
| G08G 1/07 | (2006.01) | |
| G02F 1/157 | (2006.01) | |
| G08G 1/095 | (2006.01) | |
| G09F 13/04 | (2006.01) | |
| G09F 13/10 | (2006.01) | |
| G09F 13/14 | (2006.01) | |
| H02S 20/10 | (2014.01) | |
| H02S 20/21 | (2014.01) | |
| H02S 40/38 | (2014.01) | |

(52) U.S. Cl.
CPC ............ *G08G 1/095* (2013.01); *G02F 1/157* (2013.01); *G08G 1/07* (2013.01); *G09F 13/10* (2013.01); *G09F 13/14* (2013.01); *H02S 20/10* (2014.12); *H02S 20/21* (2014.12); *H02S 40/38* (2014.12); *G09F 2013/049* (2013.01); *G09F 2013/0472* (2013.01)

(58) Field of Classification Search
None
See application file for complete search history.

(56) References Cited

U.S. PATENT DOCUMENTS

| | | | | | |
|---|---|---|---|---|---|
| 6,707,435 | B1 * | 3/2004 | Merlato | ............ | F21V 23/0442 345/32 |
| 7,075,427 | B1 * | 7/2006 | Pace | ............ | B61L 23/06 246/125 |
| 8,081,087 | B2 * | 12/2011 | Jones | ............ | G08G 1/095 246/125 |
| D664,055 | S * | 7/2012 | Call | ............ | D10/109.1 |
| 9,245,465 | B1 * | 1/2016 | Geyer | ............ | G09F 21/04 |
| 9,305,472 | B1 * | 4/2016 | Pitts | ............ | G08B 5/006 |
| 9,640,096 | B2 * | 5/2017 | Akwei | ............ | G09F 27/007 |
| 9,659,493 | B2 * | 5/2017 | Jones | ............ | G08G 1/0955 |
| 9,874,978 | B2 * | 1/2018 | Wall | ............ | G06F 1/3262 |
| 10,019,113 | B2 * | 7/2018 | Christiansson | ....... | G06F 3/0416 |
| 10,114,342 | B2 * | 10/2018 | Kim | ............ | G04G 21/08 |
| 2006/0012487 | A1 * | 1/2006 | Gibson | ............ | G08B 5/006 340/815.45 |
| 2006/0061487 | A1 * | 3/2006 | Heap | ............ | G09F 13/22 340/908 |
| 2007/0290886 | A1 * | 12/2007 | Stam | ............ | B60Q 9/00 340/907 |

(Continued)

*Primary Examiner* — Fekadeselassie Girma
(74) *Attorney, Agent, or Firm* — Jefferson IP Law, LLP

(57) ABSTRACT

A traffic sign board easily identifiable during day and night is provided. The traffic sign board which is easily identified at night includes a flickering operation of a backlight installed inside a frame, and easily identified by a driver during day even on a secluded country road or a deserted road due to flickering of light emitting diode (LED) light projected to a front side through a reflective sheet while the backlight is switched off.

10 Claims, 10 Drawing Sheets

(56) References Cited

U.S. PATENT DOCUMENTS

| | | | | |
|---|---|---|---|---|
| 2008/0062007 | A1* | 3/2008 | Kimbrough, Jr. | A41D 13/01 340/907 |
| 2008/0295375 | A1* | 12/2008 | Intagliata | G09F 15/0037 40/608 |
| 2009/0073590 | A1* | 3/2009 | Englander | B60R 1/083 359/872 |
| 2009/0079588 | A1* | 3/2009 | Graham | G08B 5/006 340/908 |
| 2010/0073480 | A1* | 3/2010 | Hoek | G01P 1/08 348/148 |
| 2011/0156026 | A1* | 6/2011 | Yamazaki | H01L 21/02422 257/43 |
| 2011/0273906 | A1* | 11/2011 | Nichol | G02B 6/0076 362/607 |
| 2012/0026571 | A1* | 2/2012 | Uken | B60R 1/088 359/267 |
| 2012/0091923 | A1* | 4/2012 | Kastner-Jung | B60Q 3/745 315/360 |
| 2012/0099199 | A1* | 4/2012 | Vasylyev | B29D 11/00278 359/530 |
| 2012/0206050 | A1* | 8/2012 | Spero | B60Q 1/04 315/152 |
| 2013/0155723 | A1* | 6/2013 | Coleman | G02B 6/0018 362/621 |
| 2014/0063853 | A1* | 3/2014 | Nichol | G02B 6/0028 362/616 |
| 2016/0227201 | A1* | 8/2016 | Ng | H04N 13/307 |
| 2016/0305079 | A1* | 10/2016 | Fakhari | G09F 13/22 |
| 2017/0305349 | A1* | 10/2017 | Naboulsi | B60R 1/04 |
| 2018/0180778 | A1* | 6/2018 | Pricone | B29D 11/00605 |

\* cited by examiner

TRAFFIC SIGN BOARD EASILY IDENTIFIABLE DURING DAY AND NIGHT

CROSS-REFERENCE TO RELATED APPLICATION(S)

This application is based on and claims priority under 35 U.S.C. § 119(a) of a Korean patent application number 10-2017-0098298, filed on Aug. 2, 2017, in the Korean Intellectual Property Office, the disclosure of which is incorporated by reference herein in its entirety.

BACKGROUND

1. Field

The disclosure relates to a traffic sign board easily identifiable during day and night. More particularly, the disclosure relates to a traffic sign board which is divided into an inner side and an outer side, in which the inner side is configured to attract attention and allow contents printed on the traffic sign board to be seen by emitting light at night through surface light emission, and the outer side is configured to attract attention even during day by a flickering operation of a light emitting diode (LED) provided on an edge while allowing the contents printed on the traffic sign board to be seen.

2. Description of the Related Art

In general, a traffic sign board is installed for safe travelling of a vehicle or the vehicle and a pedestrian, and for notifying a precise current position or a direction. There are various types of traffic sign boards installed on a road, such as warning sign boards for guidance such as a speed bump sign, a roadwork-ahead sign, or a falling rocks sign, regulatory sign boards that restrict traffic or movement such as a no-parking sign, a stop sign, or a closed-to-bicycles sign, and instruction sign boards that guide a direction of movement such as a one-way traffic sign, a left turn sign, or a U-turn sign.

In addition, the traffic sign boards are generally prepared by printing on a circular or polygonal board, in which the board is mainly formed of a metal plate or a plastic plate, and symbols, numbers, or characters specified in regulations are printed on the board so as to be highly visible, so that drivers may see the traffic sign boards and act according to the sign boards, thereby maintaining the traffic order.

However, the traffic sign boards are generally exposed to the atmosphere and contaminated with foreign substances due to climatic change so as to cause the foreign substances to cover printed contents, so that visibility is reduced even during day until such problems are improved.

In addition, the traffic sign boards cannot be seen, especially at night, without headlights. In particular, the sign boards installed above the road without being installed on a side of the road are seen in close proximity, causing a danger of a major accident.

Therefore, in recent years, the visibility is ensured even at night by using light emitting devices on the traffic sign boards. However, such light emission causes a great amount of power consumption, so that a power is supplied by a separate power line for the light emission. Thus, it is practically difficult to implement the light emitting devices on the traffic sign boards in mountains, deserted areas or the like due to a great amount of required expenditure.

Accordingly, in recent years, the light emission is attempted using sunlight to allow the light emission of the traffic sign boards even in the deserted areas. However, a disadvantage of sunlight is that an area of a solar cell has to be large in order to charge a large amount of power, so there may be many difficulties in practical installation and operation.

Moreover, the light emission is performed only at night, and the traffic sign boards cannot function during day when the traffic sign board is contaminated with the foreign substances which prevent the contents of the traffic sign boards from being recognized.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method to raise awareness regardless of the printed contents during day, and enable identification using the light emission at night.

Another aspect of the disclosure is to enable the light emission during day and night by the sunlight using a solar cell so as to be installed at a low cost even in the deserted areas, according to the related art.

Additional aspects will be set forth in part in the description which follows and, in part, will be apparent from the description, or may be learned by practice of the presented embodiments.

In accordance with an aspect of the disclosure, surface light emission and flickering light emission are performed on an inner side of a board having a predetermined area and printed according to the regulations or the like and an outer side separated from the inner side, respectively, in which the surface light emission is performed only at night, and the flickering light emission is performed only during day, so that the light emission may be performed during day and night even with a low power.

For this purpose, a plurality of through-holes are formed in the outer side of the board at a predetermined interval, and a light emitting diode (LED) is mounted in the though-hole and configured to flicker, in which a red LED is used to improve the visibility.

In addition, the surface light emission is implemented by modularization such that partial surface light emission is performed only on a printed portion according to a pattern of the contents printed on the board, so that the surface light emission is performed on the inner side of the board with a low power. At night, only the surface light emission is continued while the LED flickering on an outer edge is switched off.

In accordance with another aspect of the disclosure, the light emission can be performed during day and night even with a power generated by the sunlight. Especially with the red LED flickering during day, the drivers can drive with the awareness even if the contents printed on an inner side surface of the board are unclear, thereby preventing an accident from occurring. In addition, the light emission can be performed during day and night with a low power by inducing the surface light emission only in the printed portion at night.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
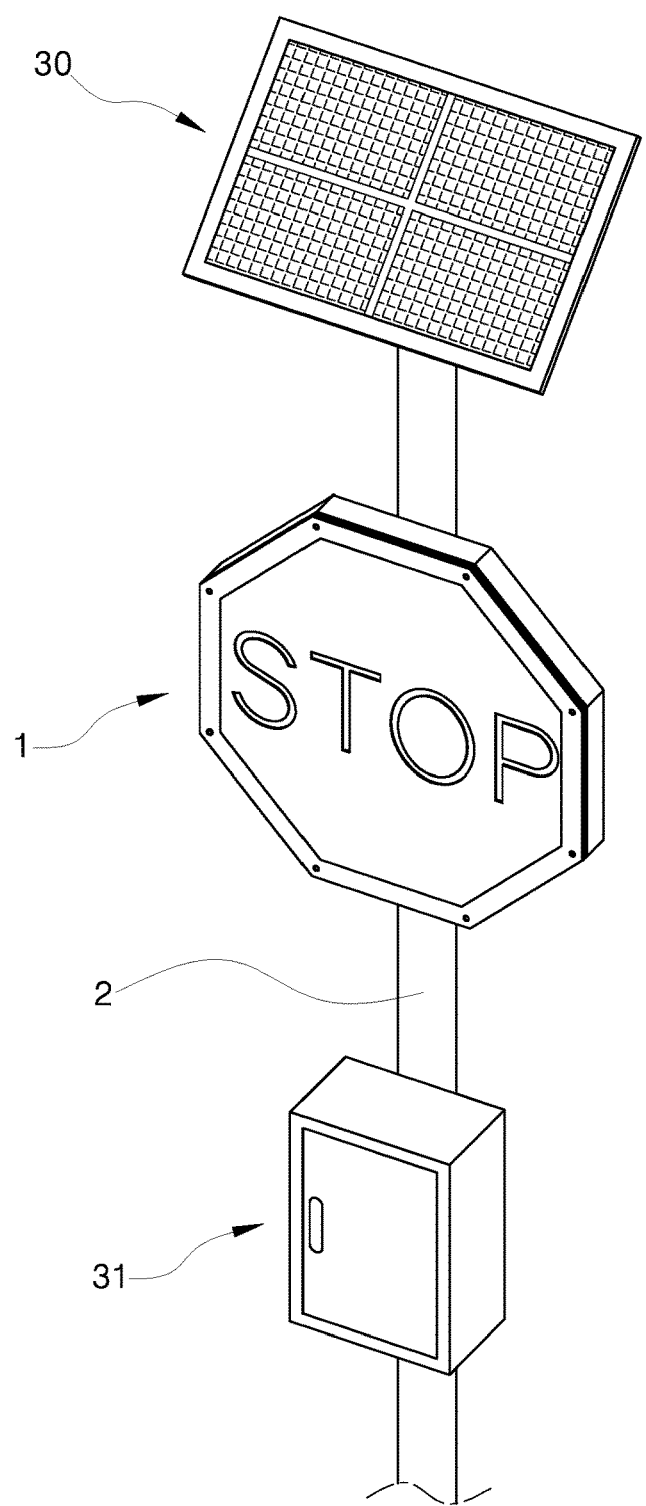
FIG. 1 is a perspective view showing a traffic sign board according to an embodiment of the disclosure.
Figure 2:
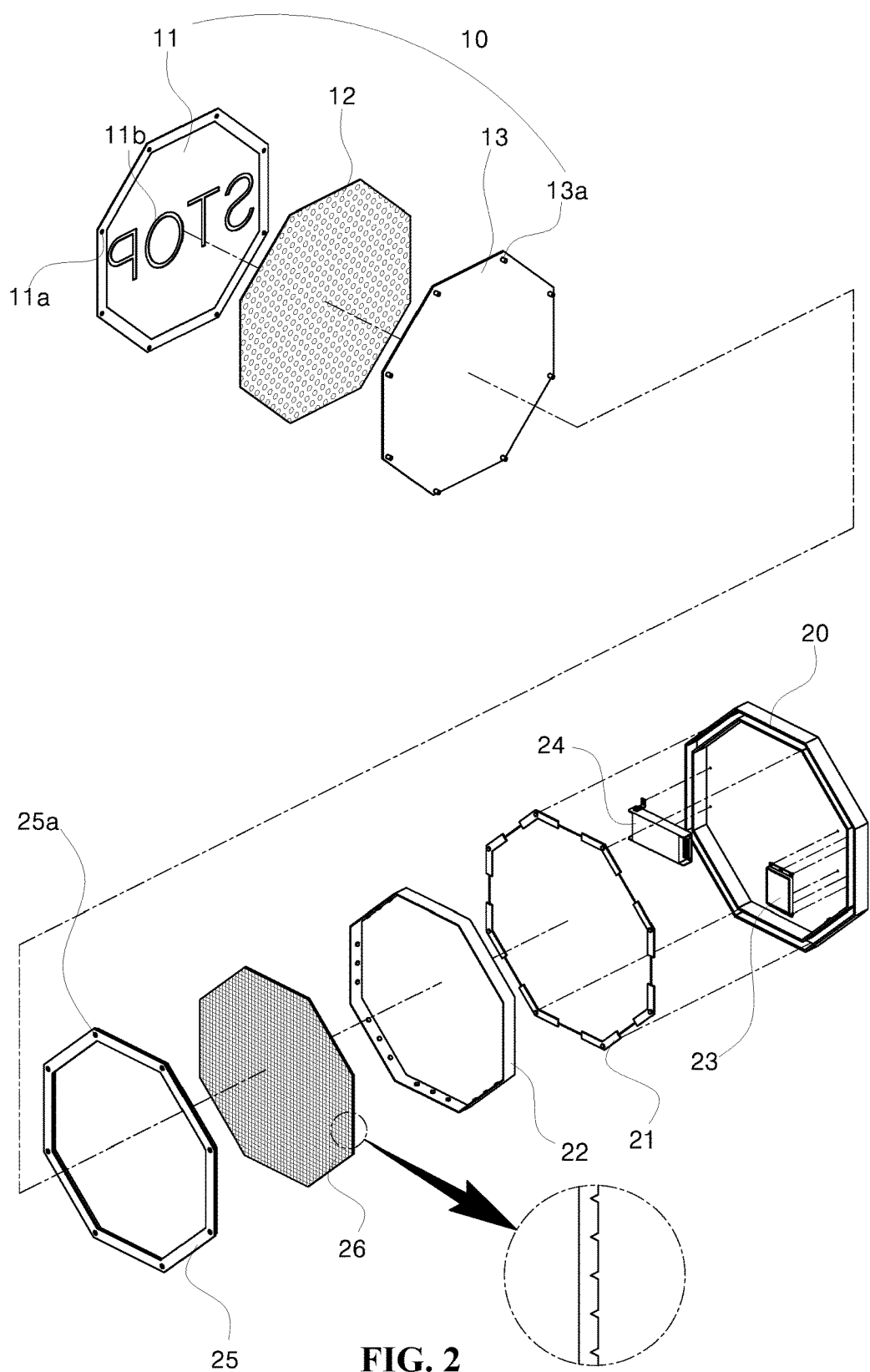
FIG. 2 is an exploded perspective view showing the traffic sign board according to an embodiment of the disclosure.

FIG. 1 is a perspective view showing a traffic sign board according to an embodiment of the disclosure. FIG. 2 shows a disassembled state of the traffic sign board of FIG. 1 according to an embodiment of the disclosure.

Referring to FIGS. 1 and 2, according to various embodiments of the disclosure, a traffic sign board 1 is installed on a pillar 2 installed on a side of a road, in which the traffic sign board has one side connected to a solar battery 30 located above the traffic sign board, and an opposite side connected to a storage battery 31 located below the traffic sign board.

In this case, the traffic sign board 1 includes: a sign board 10 including a reflective sheet 12 attached to a top or a bottom of a polygonal or circular board 13, and an electrochromic film (EC film) 11 having a plurality of through-holes 11a and a sign part 11b formed by perforating the EC film 11 in a shape of a symbol, a character, or a number and attached to a top or a bottom of the reflective sheet 12, such that the perforated symbol or character forms an engraved configuration; and a frame 20 one side of which is opened to form an inner space 20a in the frame 20, and coupled to the sign board 10.

In this case, the sign board 10 includes a reflective sheet 12 attached to the board 13 to reflect light of a vehicle emitted to the sign part to allow the sign part to be easily recognized by eyes of a vehicle driver. However, according to another embodiment, a sheet formed of a translucent material may be attached to the board 13 instead of the reflective sheet 12 to allow surface light emission so as to allow the sign part to be recognized.

In addition, the sign board 10 is provided at an edge thereof with a coupling pole 13a protruding downward from the through-hole 11a of the EC film 11. Correspondingly, the frame 20 is provided at an edge thereof with a finishing frame 25 formed with a connection hole 25a, provided at an inner side thereof with a light emitting diode (LED) unit 21 to allow light of each LED 21b to be emitted outside the sign board 10 through the connection hole 25a, and has an inner space 20a in which a backlight 22 is installed together with a light guide plate 26, so that light of the backlight 22 can be recognized while being distinguished from the light of the LED 21b.

In addition, the backlight 22 and the LED unit 21 are connected to a control board 23 for switching an on/off operation from the backlight 22 to the LED unit 21 or from the LED unit 21 to the backlight 22 during day and at night and for controlling the backlight 22 and the LED unit 21 to flicker, and the control board 23 is connected to a power management board 24 for supplying a power to the LED unit 21 and the backlight 22, so that, even in a case of the traffic sign 1 installed in a secluded country road or a deserted road where management is not performed, the surface light emission is performed at night to allow the contents printed on the traffic sign board to be seen so as to attract attention, and the outer side of the traffic sign board is configured to attract attention even during day by a flickering operation of the LED provided on the edge while allowing the contents printed on the traffic sign board to be seen.

Figure 3:
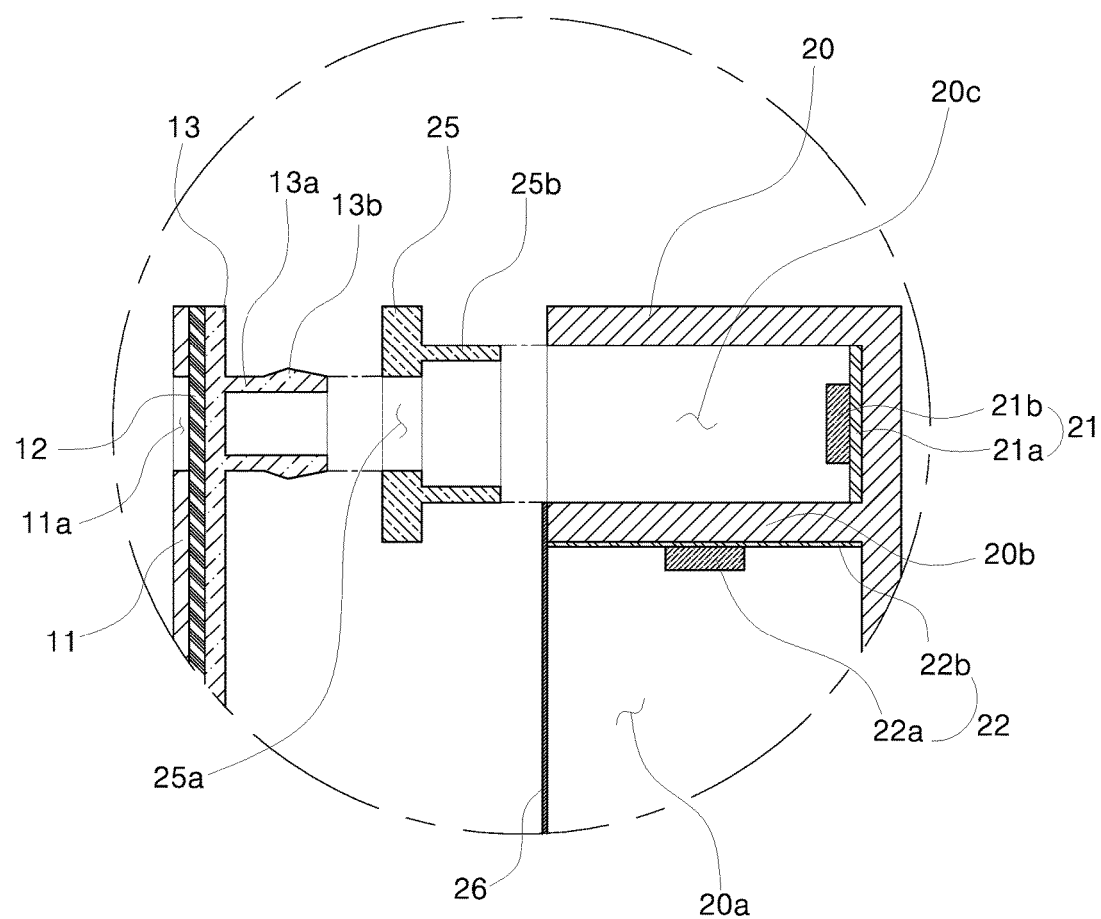
FIG. 3 is a sectional view showing an assembled state of the traffic sign board according to an embodiment of the disclosure.

FIG. 3 is a sectional view showing a frame and a sign board coupled to frame of the traffic sign board according to an embodiment of the disclosure.

Referring to FIG. 3, according to the disclosure, the frame 20 is formed at an inside thereof with a protruding wall 20b protruding in a direction identical to a protruding direction of an outer wall of the frame 20 while maintaining a predetermined distance from the outer wall to define a fitting space 20c at the edge of the frame 20.

In addition, the fitting space 20c is coupled with a finishing frame 25 having a plurality of assembly walls 25b provided at a lower end of a connection hole 25a, the assembly walls 25b formed on one side and an opposite side of the finishing frame 25 fixedly make close contact with the outer wall and the protruding wall 20b that define the fitting space 20c, and the connection hole 25a of the finishing frame 25 is coupled with the board 13 to which the EC film 11 and the reflective sheet 12 are attached such that a coupling pole 13a of the board 13 passes through the connection hole 25a and is coupled inside the fitting space 20c.

In this case, the coupling pole 13a is provided at an edge thereof with a latching sill 13b protruding obliquely along an outer circumference of the coupling pole 13a to prevent the coupling pole 13a from being separated to an outside of the finishing frame 25. According to another embodiment, a concave groove is formed at an inner side of the assembly wall 25b of the finishing frame 25 or an inner side of the protruding wall 20b, so that the latching sill 13b of the coupling pole 13a may be engaged with the concave groove.

Figure 4:
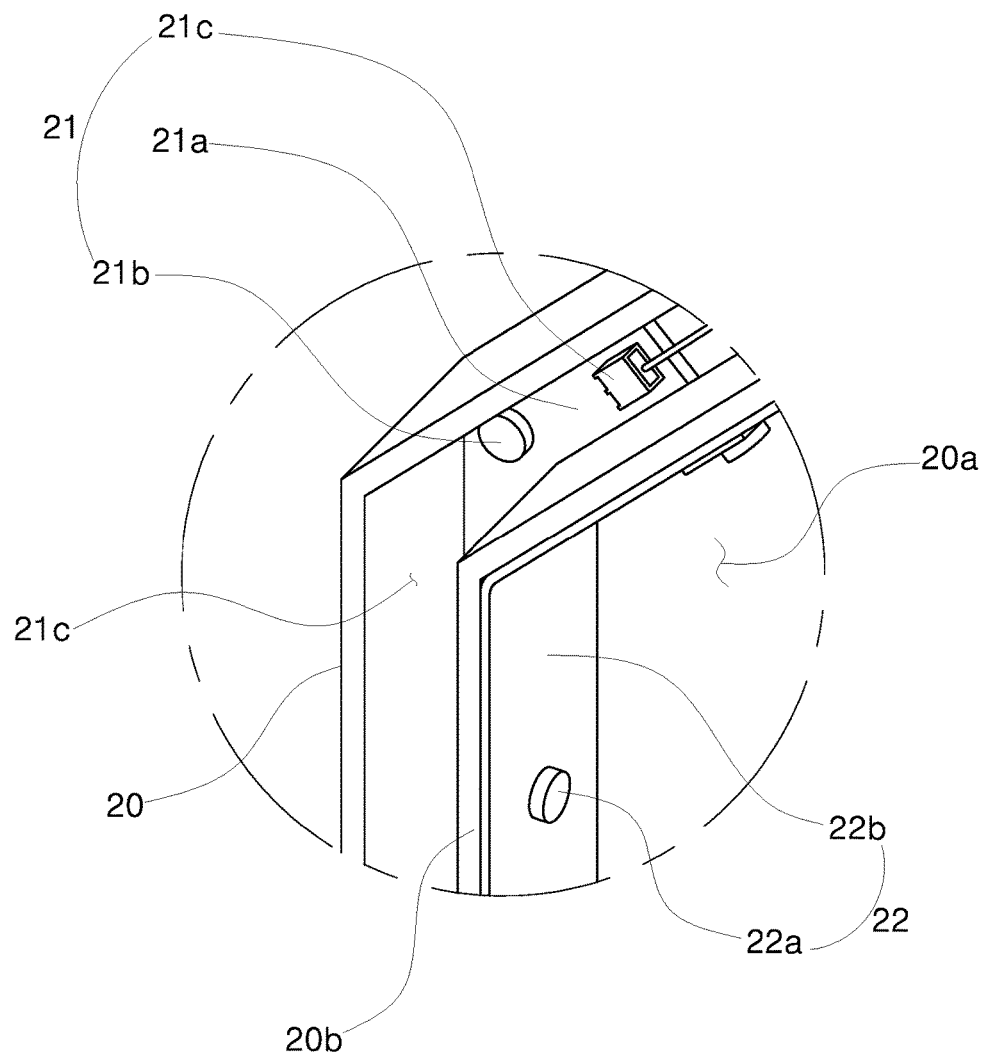
FIG. 4 is a partial enlarged view showing the traffic sign board according to an embodiment of the disclosure.

FIG. 4 shows the LED unit inserted into the fitting space and the backlight attached to the protruding wall according to an embodiment of the disclosure.

Referring to FIG. 4, the LED unit 21 of the disclosure includes a flat printed circuit board (PCB) substrate 21a having one side and an opposite side formed at different angles, and an LED 21b is installed at a center of the bent PCB substrate 21a so as to allow the LED 21b positioned at the center of the PCB substrate 21a to be automatically placed at a designated position when the PCB substrate 21a is mounted inside the fitting space 20c, so that the light of the LED 21b is emitted outside through the connection hole 25a of the finishing frame 25 and the coupling pole 13a of the board 13 without particular position adjustment.

In addition, the PCB substrate 21a having an obtuse angle or an acute angle may be mounted on an edge portion of the fitting space 20C. However, according to another embodiment, the frame 20 may have a circular shape while the PCB substrate is formed in a curved shape and mounted inside the fitting space.

In addition, the one side and the opposite side of the PCB substrate 21a are provided with a connection port 21c and a connection cable to allow another PCB substrates to be connected to the one side and the opposite side of the PCB substrate 21a, respectively, so as to form the LED unit 21 mounted in the fitting space 20c of the frame 20.

For reference, one of a plurality of PCB boards connected to each other is connected to the control board 23, so that a plurality of LEDs 21b flicker in a specific color according to instructions of the control board 23 so as to attract attention while allowing easy identification during day.

In addition, the backlight 22 may include a plurality of LEDs mounted on the PCB board at a predetermined interval, or may include a plurality of LEDs 22a installed at a predetermined interval on a flexible printed circuit board (FPCB; 22b) which has a flexible strip shape elongated in a longitudinal direction. In this case, the backlight 22 is fixedly installed at the protruding wall 20b and performs the surface light emission when the LED emits the light from a lateral side of the backlight 22 so as to attract attention while allowing easy identification at night.

In addition, the light guide plate 26 performs the surface light emission. According to another embodiment, the light guide plate 26 is formed at one side surface thereof with line patterns which are etched to be inclined at a predetermined angle in a vertical direction or a horizontal direction, so that the light of the LED is scattered by the etched line patterns to allow the surface light emission when the backlight 22 attached to the protruding wall 20b emits the light laterally. For reference, a reflective sheet is attached to an inner side of the frame so that the light of the LED emitted from the side can be emitted forward.

Figure 5:
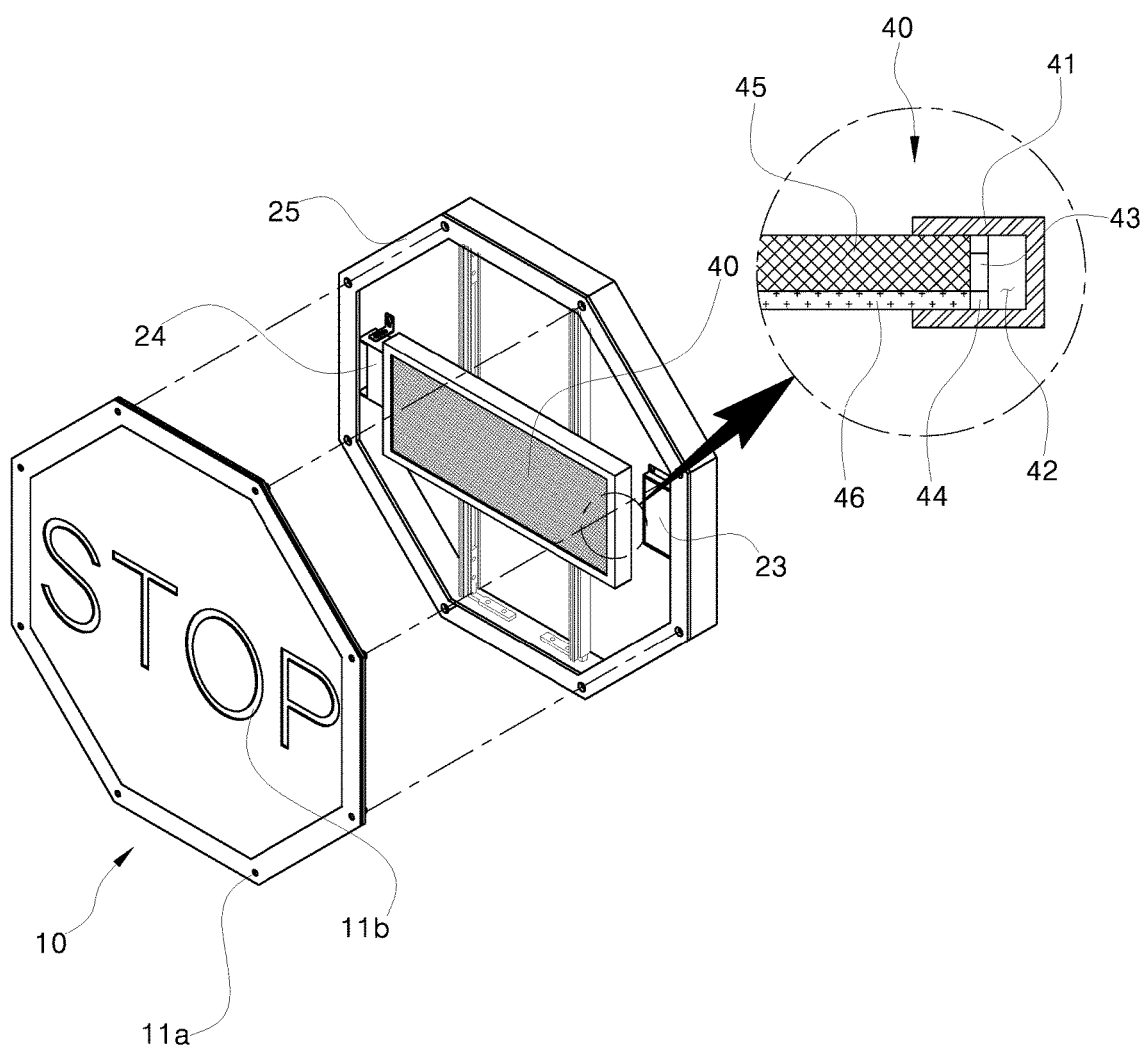
FIG. 5 is an exploded perspective view showing a state in which a light emitting diode (LED) module is installed inside a frame according to an embodiment of the disclosure.

FIG. 5 shows a state in which an LED module is installed inside the frame instead of the backlight to allow the surface light emission only at the sign part of the sign board according to an embodiment of the disclosure.

Referring to FIG. 5, the LED module 40 includes a PCB 44 or an FPCB having a plurality of LEDs 43 provided at a predetermined interval and installed inside a polygonal boarder frame 41 having an inner space 42, and a transparent or translucent light guide plate 45 having a predetermined thickness, having a rear end attached to a reflective sheet 46, and mounted in the inner space 42, wherein the LED module 40 is mounted on an inner side of the frame to perform forward surface light emission through the reflective sheet when the LED mounted in the boarder frame emits the light laterally, so that the LED module 40 is modularized to operate with a low power such that the sign part of the sign board can be separately recognized when the LED of the LED unit is switched off.

Figure 6:
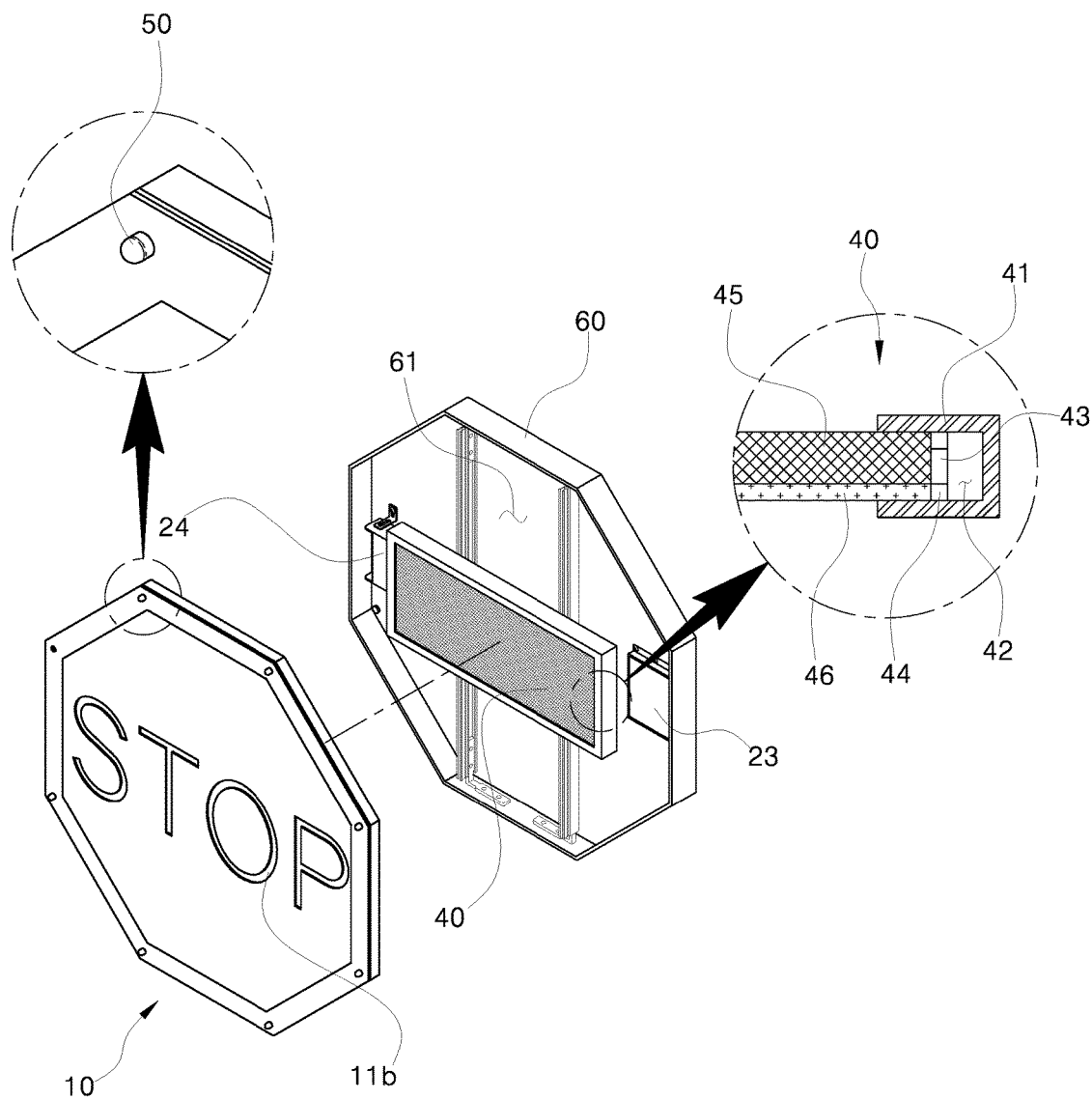
FIGS. 6 and 7 are exploded perspective views showing a traffic sign board according to various embodiments of the disclosure.
Figure 7:
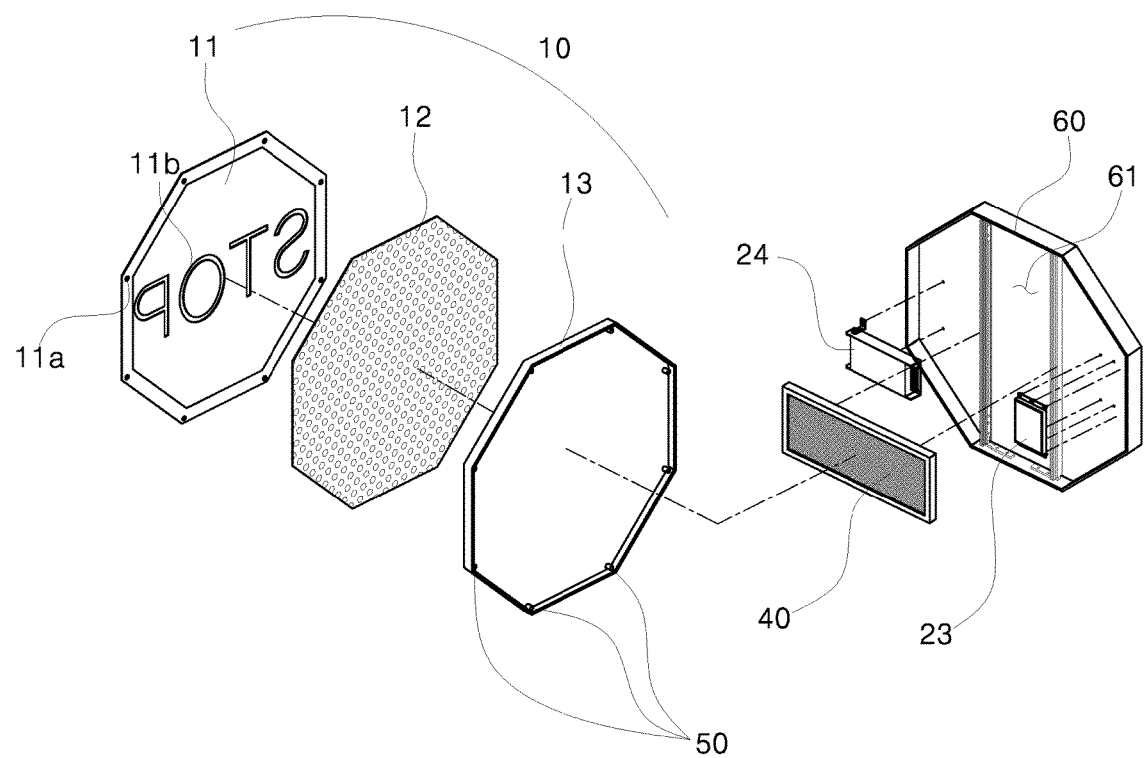

FIG. 6 shows a traffic sign board according to an embodiment of the disclosure. FIG. 7 is an exploded perspective view of FIG. 6 according to an embodiment of the disclosure.

As shown in FIGS. 6 and 7, according to an embodiment of the disclosure, a sign board 10 includes a reflective sheet 12 attached to a polygonal or circular board 13, and an EC film 11 formed with a sign part 11b and attached to the reflective sheet 12, in which a plurality of through-holes 11a are formed in an outer edge of the sign board 10 at a predetermined interval, and an LED 50 is installed inside each of the through-holes.

A frame 60 coupled to the sign board 10 is provided at an inner space 61 thereof with an LED module 40 for surface light emission at night, a control board 23 for controlling the LED module 40 and the LED 50 of the sign board such that the LED 50 provided at the outer edge of the sign board 10 flickers during day to attract attention of a driver, and the LED module 40 installed inside the frame 60 performs the surface light emission at night to allow the sign part of the sign board to be easily identified, and a power management board 24 for supplying a power to the control board 23 and the LED module 40.

For reference, the sign board 10 includes a reflective sheet 12 attached to the board 13 to reflect light of a vehicle emitted to the sign part to allow the sign part to be easily recognized by eyes of a vehicle driver. However, a sheet formed of a translucent material may be attached to the board 13 instead of the reflective sheet 12 to allow surface light emission so as to allow the sign part to be recognized.

Figure 8:
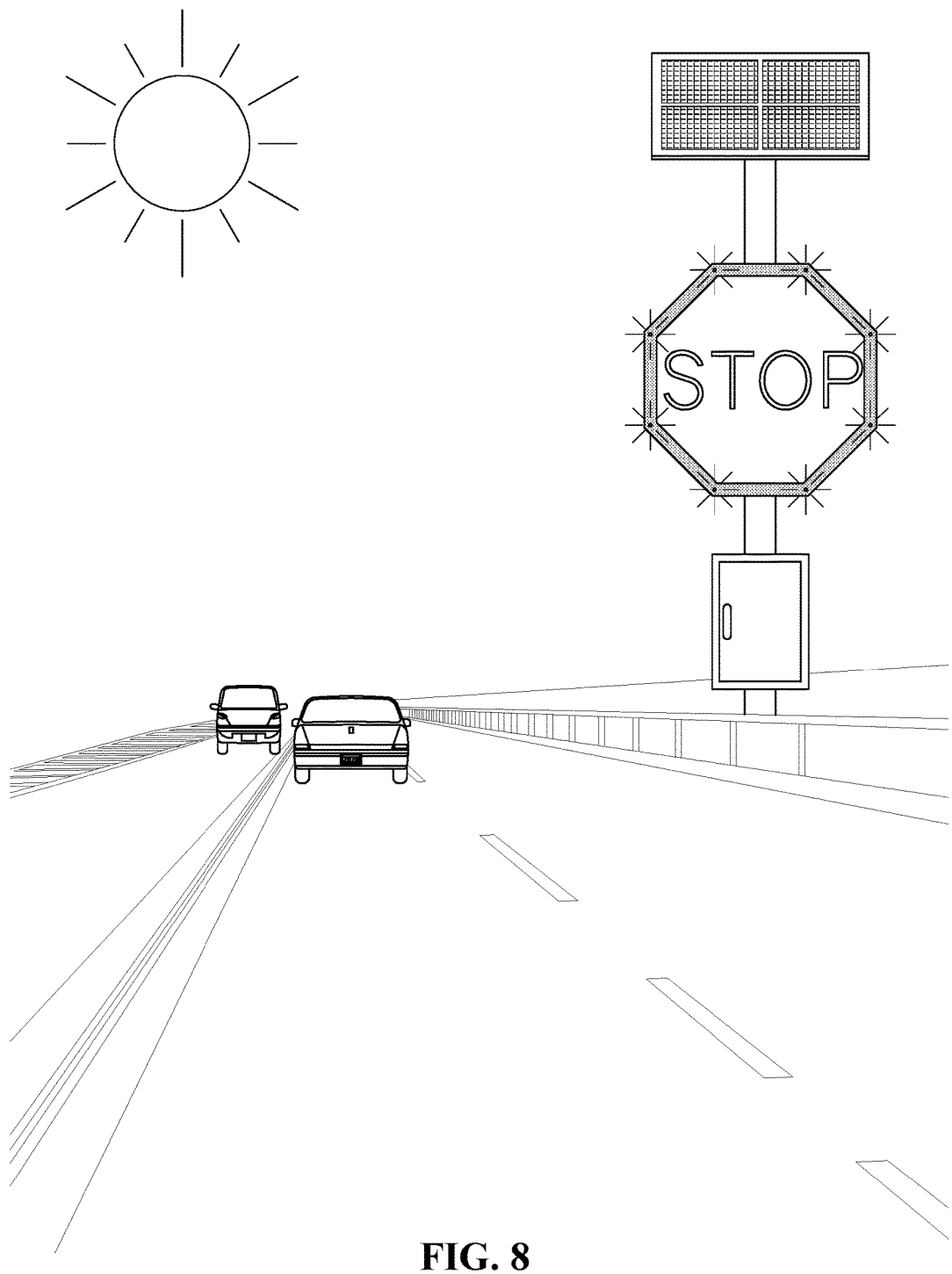
FIG. 8 is a block diagram showing the traffic sign board according to an embodiment of the disclosure.
Figure 9:
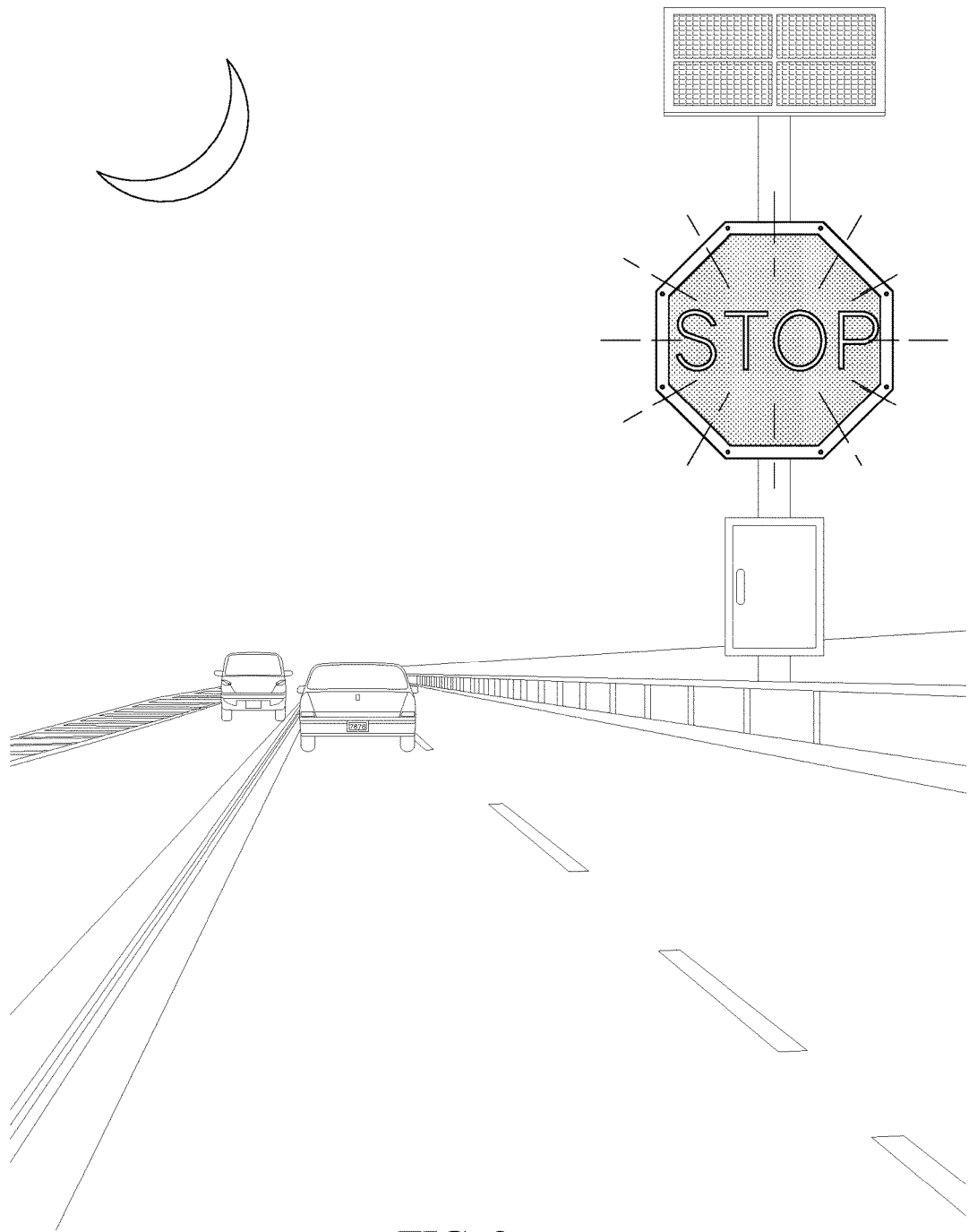
FIGS. 9 and 10 are views showing the use of the traffic sign board which flickers or performs surface light emission during day and at night according to various embodiments of the disclosure.
Figure 10:
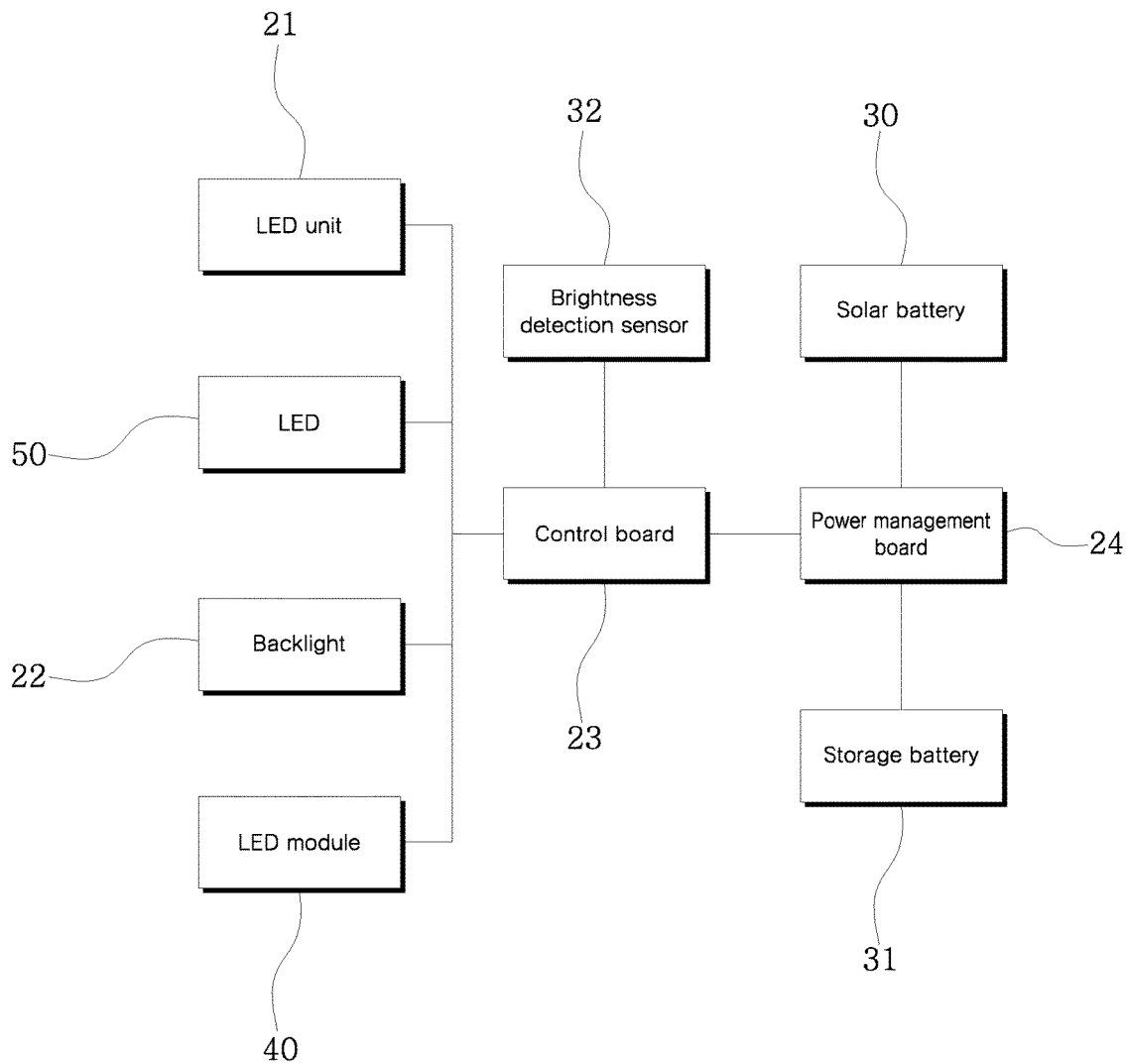

For reference, FIG. 8 schematically shows a configuration according to the embodiment of the disclosure, and FIGS. 9 and 10 show a state of attracting attention of a driver during day and at night according to various embodiments of the disclosure.

Referring to FIGS. 8, 9, and 10, the disclosure includes an LED unit 21 for performing a flickering operation, a backlight 22 for surface light emission, a control board 23 for controlling the LED unit 21 and the backlight 22, a power management board 24, a solar battery 30, a storage battery 31, and a brightness detection sensor 32.

According to another embodiment, the disclosure may include an LED 50 for performing a flickering operation, an LED module 40 for surface light emission, a control board 23, a power management board 24, a solar battery 30, a storage battery 31, and a brightness detection sensor 32.

For reference, the LED unit 21 emits light outside the sign board 10 by the flickering operation to attract attention of a driver so that the driver can recognize the traffic sign board during day. According to the disclosure, one side and an opposite side of a flat PCB substrate 21a are formed at different angles, an LED 21b is provided at a center of the PCB substrate 21a, and a connection port is formed at the one side and the opposite side about the LED 21b and connected to a cable.

Alternatively, the LED 50 protruding outside a through-hole 11a of the sign board 10 emits light outside the sign board 10 by the flickering operation to attract attention of the driver so that the driver can recognize the traffic sign board during day.

In addition, the backlight 22 performs the surface light emission to allow a symbol, a character, or a number formed on the sign board to be recognized at night, in which a plurality of LEDs 22a are installed at a predetermined interval on a FPCB 22b which is elongated in a longitudinal direction, and the FPCB 22b is attached to the protruding wall 20b. The backlight 22 may be the LED module 40 according to another embodiment.

In addition, the LED module 40 includes a PCB 44 or an FPCB having a plurality of LEDs 43 provided at a predetermined interval and installed inside a polygonal boarder frame 41 having an inner space 42, and a transparent or translucent light guide plate 45 attached to a reflective sheet 46 and fitted in the inner space 42 so as to allow forward surface light emission of the LED module 40 through the reflective sheet 46 when the LED 43 emits light laterally.

In addition, the control board 23 switches an on/off operation from the backlight to the LED unit or from the LED unit to the backlight while controlling the backlight or LED to flicker according to a preset time interval.

In this case, the control board 23 may switch the on/off operation from the backlight to the LED unit or from the LED unit to the backlight based on information reported from the brightness detection sensor, or may switch the on/off operation or the backlight or the LED based on information reported by the power management board.

For reference, the power management board 24 manages a power applied to the backlight or the LED, and is connected with the solar battery 30 and the storage battery 31 to check a power state of the solar battery and control charging/discharging of the storage battery.

In other words, the power management board controls a power accumulated in the solar battery 30 to be applied and charged to the storage battery when the solar battery 30 is charged with a predetermined amount of power or more, and the power management board applies the charged power to the backlight or the LED when the power charged in the storage battery 31 is within a preset range.

In this case, the power management board 24 reports information on an amount of the power accumulated in the solar battery to the control board to receive instructions from the control board when the amount of the power accumulated in the solar battery is less than a predetermined amount, and applies the charged power to the backlight based on the instructions to allow the surface light emission.

In addition, the power management board reports the information on the amount of the power accumulated in the solar battery to the control board to receive instructions from the control board when the amount of the power accumulated in the solar battery is greater than a predetermined amount, and applies the power to the LED mounted on the edge of the frame while the backlight is switched off based on the instructions to allow the LEDs to emit the light outside the sign board.

In addition, the solar battery 30 is a device for converting light energy into electric energy, in which an accumulated power is stored in the storage battery by the power management board and discharged to the LED unit or the backlight by the control board when a predetermined amount of power or more is stored in the storage battery.

Further, the solar battery 30 and the storage battery 31 may be installed on one side of the pillar, or the solar battery may be formed at a rear end of the frame of the traffic sign board while the storage battery is mounted inside the pillar or the frame according to another embodiment.

In addition, the brightness detection sensor 32 is an illuminance sensor or an optical sensor capable of detecting ambient brightness, in which the brightness detection sensor 32 reports a brightness state to the control board when it becomes dark or bright at a periphery of the traffic sign board to allow the control board to switch the on/off operation from backlight to LED unit or from LED unit to backlight.

Therefore, according to the disclosure, the power management board, the control board, and the backlight and the LEDs which are connected to the power management board and the control board are installed inside the frame to switch the on/off operation from backlight to LED unit or from LED unit to backlight, so that identification is easy at night by attracting attention by the flickering operation of the backlight, and the sign part is easily recognized during day by attracting attention through the light of the LED flickering outside the sign board.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A traffic sign board comprising:
    a sign board including an electrochromic film (EC film) comprising:
        a plurality of through-holes and a sign part formed by perforating the EC film in a shape of a symbol, a character, or a number;
        a reflective sheet onto which the EC film is attached such that the perforated symbol or character forms an engraved configuration; and
        a board to which the reflective sheet is attached;
    a frame, one side of which is opened to form an inner space in the frame, and mounted thereon with the sign board;
    a backlight mounted at an inner side of the frame;
    a light emitting diode (LED) unit having a plurality of LEDs installed on an inner edge of the frame at a predetermined interval;
    a control board connected to the backlight and the LEDs to switch an on/off operation from the backlight to the LED unit or from the LED unit to the backlight, such that the LED flickers during day to allow light of the LED to be projected out of the through-hole of the EC film, and the backlight flickers through surface light emission at night; and
    a power management board connected to the control board to control power supply to the backlight or the LED.

2. The traffic sign board of claim 1,
wherein the power management board has one side connected to a solar battery, which converts light energy into electric energy, and an opposite side connected to a storage battery,
wherein the power management board controls a power accumulated in the solar battery to be applied and charged to the storage battery when the solar battery is charged with a predetermined amount of power or more, and
wherein the power management board applies the charged power to the backlight or the LED when the power charged in the storage battery is within a preset range.

3. The traffic sign board of claim 2,
wherein the power management board applies the power to the backlight while the LED unit is switched off and allows the control board to control the backlight to flicker when an amount of the power accumulated in the solar battery is less than a predetermined amount, and
wherein the power management board applies the power to the LED unit mounted on the edge of the frame while the backlight is switched off and allows the control board to control the LEDs to flicker when the amount of the power accumulated in the solar battery is greater than a predetermined amount.

4. The traffic sign board of claim 1,
wherein the control board includes a brightness detection sensor for detecting ambient brightness, and
wherein the control board switches an on/off operation from the backlight to the LED unit or from the LED unit to the backlight based on information detected through the brightness detection sensor.

5. The traffic sign board of claim 1,
wherein the frame is formed with a protruding wall protruding in a direction identical to a protruding direction of an outer wall of the frame while maintaining a predetermined distance from the outer wall to define a fitting space at the edge of the frame,
wherein the fitting space is coupled with a finishing frame having a plurality of assembly walls provided at a lower end of a connection hole,
wherein the assembly walls formed on one side and an opposite side of the finishing frame fixedly make close contact with the outer wall and the protruding wall that define the fitting space, and
wherein the connection hole of the finishing frame is coupled with the sign board such that a coupling pole of the board passes through the connection hole and is coupled inside the fitting space.

6. The traffic sign board of claim 5,
wherein the LED unit includes a flat PCB substrate having one side and an opposite side formed at different angles and provided at a center thereof with an LED,
wherein the LED is automatically positioned at the lower end of the connection hole of the finishing frame due to the PCB substrate formed at different angles when the LED is mounted inside the fitting space, and
wherein the one side and the opposite side of the PCB substrate are provided with a connection port and a connection cable to allow another adjacent PCB substrates to be connected to the one side and the opposite side of the PCB substrate, respectively.

7. The traffic sign board of claim 5, wherein the backlight includes a plurality of LEDs installed at a predetermined interval on an inner side of a flexible printed circuit board (FPCB) which is elongated in a longitudinal direction and attached to an inner side of the protruding wall.

8. The traffic sign board of claim 1, wherein the backlight includes:
an LED module including a printed circuit board (PCB) or a flexible PCB (FPCB) comprising a plurality of LEDs provided at a predetermined interval and installed inside a polygonal boarder frame comprising an inner space, and
a transparent or translucent light guide plate having a predetermined thickness, a rear end attached to a reflective sheet, and fitted inside the inner space to allow surface light emission of the LED module by allowing the light to be emitted forward through the reflective sheet when the LED emits the light laterally.

9. The traffic sign board of claim 1, wherein the reflective sheet reflects light of a vehicle emitted to the sign part to allow the sign part to be easily identified, or is formed of a translucent material to transmit the light upon the surface light emission to allow the sign part to be easily identified.

10. A traffic sign board, comprising:
a sign board comprising:
a reflective sheet attached to a polygonal or circular board; and
an electrochromic (EC) film formed with a sign part and attached to the reflective sheet, in which a plurality of through-holes are formed in an outer edge of the sign board at a predetermined interval,
wherein a light emitting diode (LED) is installed inside each of the through-holes, and
a frame coupled to the sign board and provided at an inner space thereof with an LED module for surface light emission at night, a control board for controlling the LED module and the LED of the sign board such that an LED provided at the outer edge of the sign board flickers during day to attract attention of a driver, the LED module installed inside the frame to perform the surface light emission at night to allow the sign part of the sign board to be easily identified, and a power management board for supplying a power to the control board and the LED module,
wherein the LED module comprises:
a printed circuit board (PCB) or a flexible PCB (FPCB) having a plurality of LEDs provided at a predetermined interval and installed inside a polygonal boarder frame having an inner space; and
a transparent or translucent light guide plate having a predetermined thickness, having a rear end attached to a reflective sheet, and fitted inside the inner space to allow surface light emission of the LED module by allowing the light to be emitted forward through the reflective sheet when the LED emits light laterally.

* * * * *